July 14, 1931. J. N. WETMORE 1,814,991
LAWN MOWER
Filed Sept. 16, 1929 4 Sheets-Sheet 2

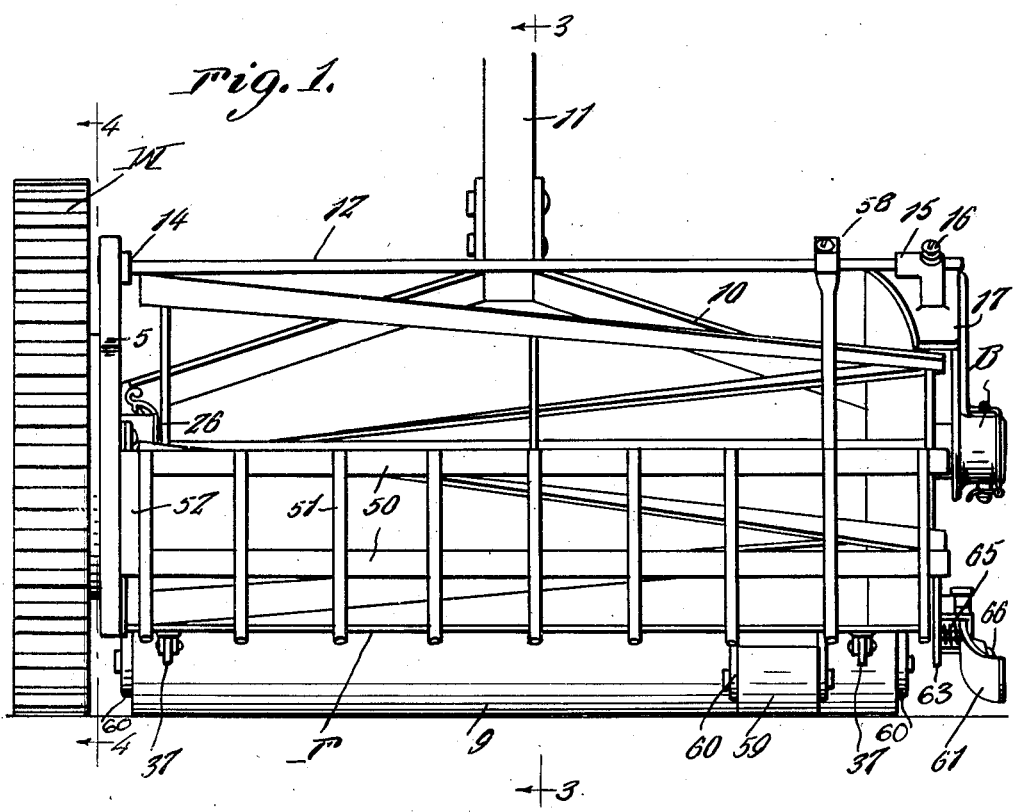
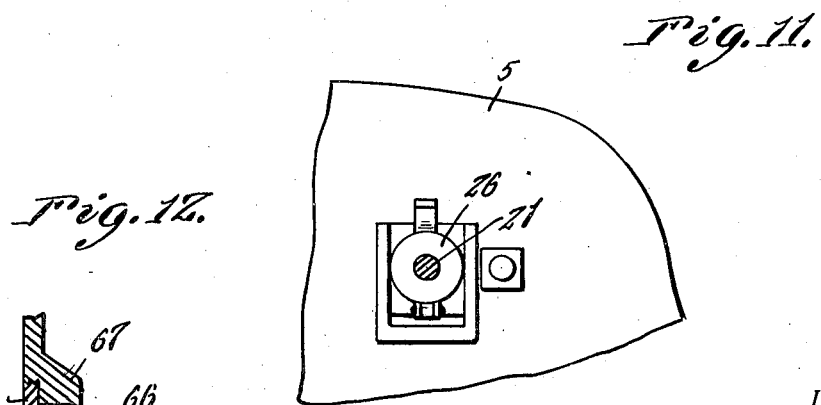
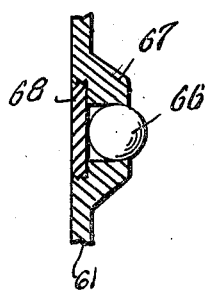

Inventor
Julian N. Wetmore

By Clarence A. O'Brien
Attorney

July 14, 1931. J. N. WETMORE 1,814,991
LAWN MOWER
Filed Sept. 16, 1929 4 Sheets-Sheet 3
Fig.3.
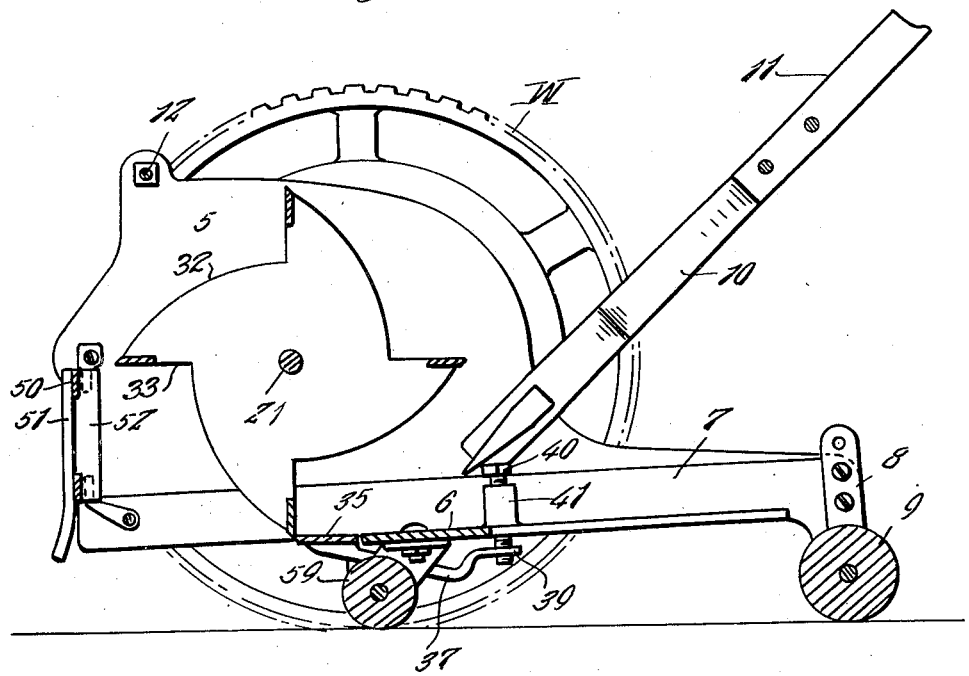
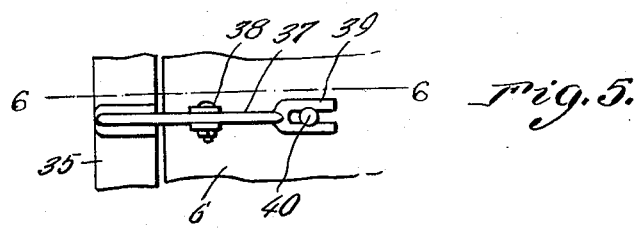
Fig.5.
Fig.6.
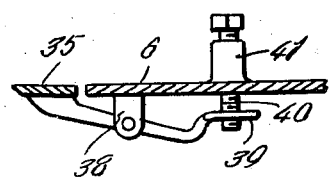
Inventor
Julian N. Wetmore
By Clarence A. O'Brien
Attorney July 14, 1931. J. N. WETMORE 1,814,991
LAWN MOWER
Filed Sept. 16, 1929 4 Sheets-Sheet 4
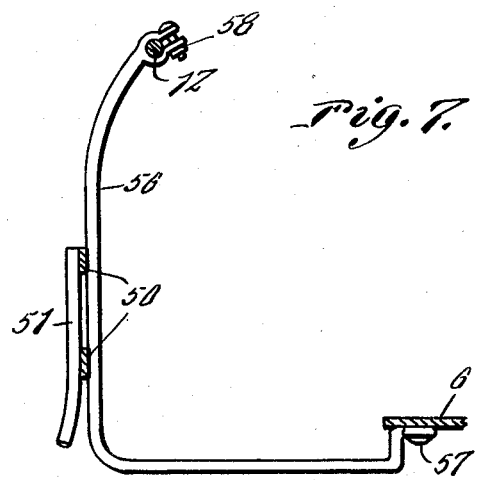
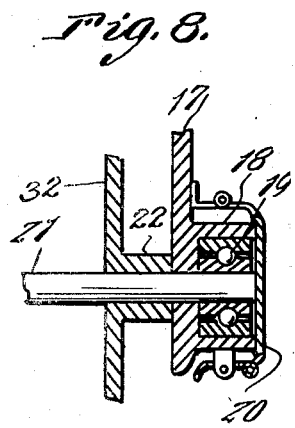
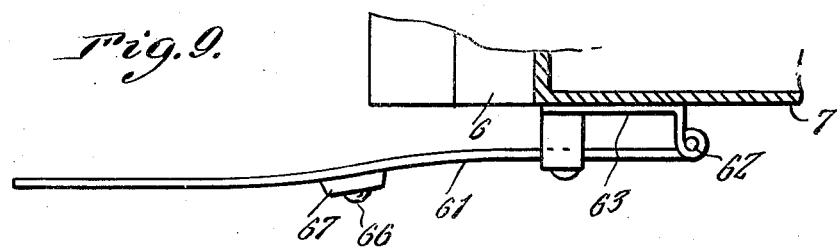
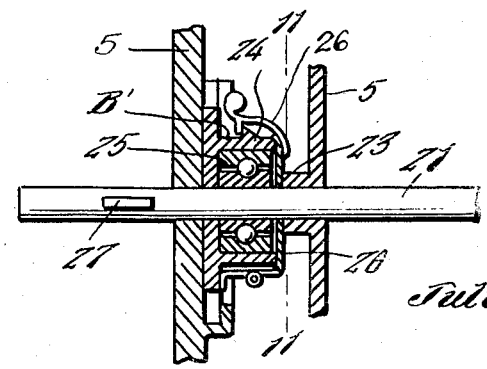
Inventor
Julian N. Wetmore
By Clarence A. O'Brien
Attorney Patented July 14, 1931

1,814,991

UNITED STATES PATENT OFFICE

JULIAN N. WETMORE, OF MIAMI, FLORIDA

LAWN MOWER

Application filed September 16, 1929. Serial No. 392,864.

The present invention relates to a lawn mower and has for its prime object to provide an exceedingly simple, compact and efficient mechanism of this nature which may be manufactured at a relatively low cost, and which is strong and durable, and possesses ease of operation and maneuverability.

Figure 2:
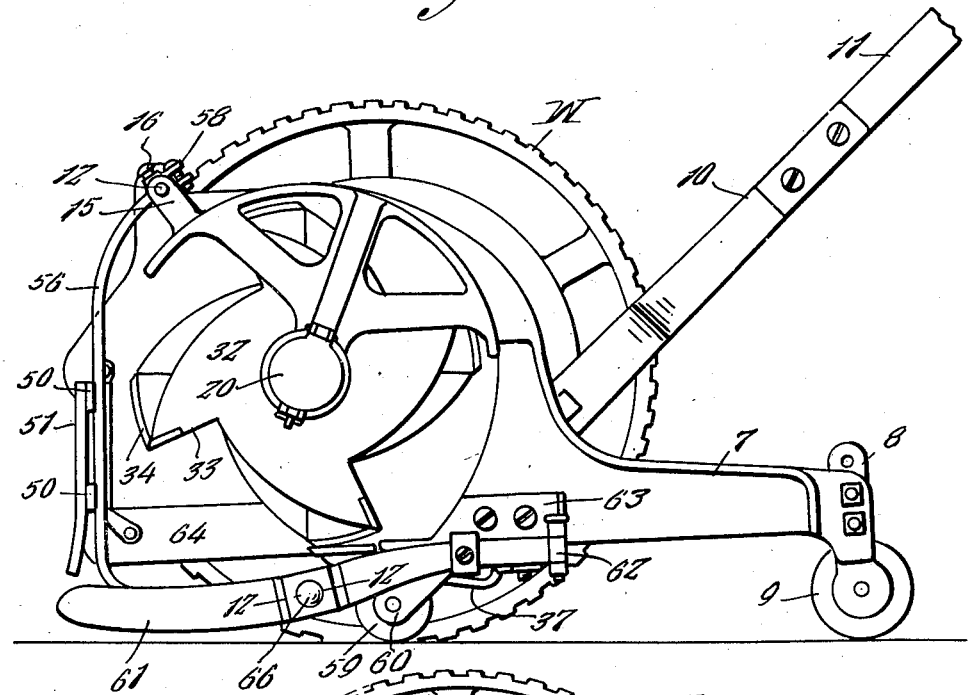
Figure 4:
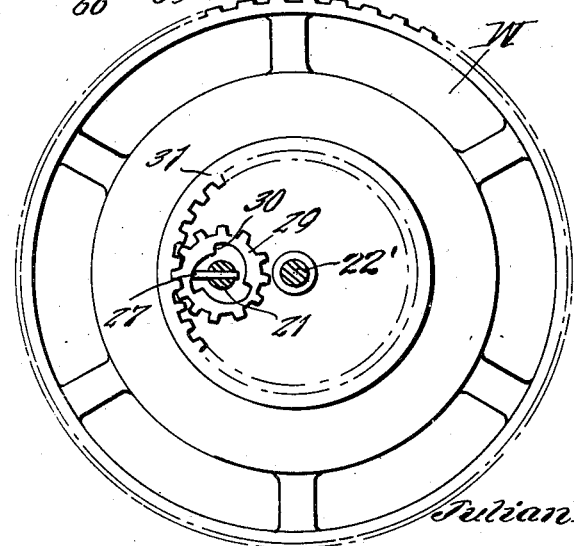

This invention accordingly consists of the features of construction, combination of parts, and in the unique relation of the members, and in the relative proportioning and dispositioning thereof, all as more completely outlined herein. To enable others skilled in the art to fully comprehend the underlying features thereof that they may embody the same by the numerous modifications in structure and relation contemplated by this invention, drawings depicting a preferred form have been annexed as a part of this disclosure and in such drawings, like characters of reference denote corresponding parts throughout all the views, of which:

Figure 1 is a front elevation of the lawn mower embodying the features of my invention, Figure 2 is a side elevation thereof, Figure 3 is a vertical longitudinal section on the line 3—3 of Figure 1, Figure 4 is a sectional view taken substantially on the line 4—4 of Figure 1, Figure 5 is a detail plan view of the adjustable knife, Figure 6 is a section taken substantially on the line 6—6 of Figure 5, Figure 7 is a detail sectional view of a frame arm, Figure 8 is a detail sectional view of a bearing at the left hand end of the machine, Figure 9 is a detail view of a side guard, Figure 10 is a detail sectional view through bearing in the right hand wheel, Figure 11 is a sectional view taken substantially on the line 11—11 of Figure 10, and Figure 12 is a sectional view taken substantially on the line 12—12 of Figure 2.

Referring to the drawings in detail it will be seen that the numeral 5 denotes a vertically disposed end plate on a horizontal cross member 6. This cross member 6 has rearward extensions 7 with adjustable brackets 8 carried at the rear end thereof and having journaled therebetween a roller 9. A handle bracket has branches 10 attached to the extension 7 and to the handle 11. A cross rod 12 is fixed as at 14 in the upper forward portion of the plate 5 and extends laterally therefrom and is received in a sleeve 15 and anchored therein by a set screw 16, this sleeve 15 is a part of an end member 17 which is integral with the cross member 6. In the central portion of the member 17 is a bearing B.

This bearing B comprises cylindrical casing 18 with a ball bearing structure 19 housed therein and maintained in place by hinged closure 20. A shaft 21 has an end journaled in the journal B and through a bearing 22 formed in the end member 17 and this shaft is journaled through the journal 23 in the plate 5 and through a bearing B' in the wheel W.

This bearing B' comprises a casing 24 with ball bearing structure 25 housed therein and maintained in place by hinged cap plates 26. A pawl 27 is provided on the shaft 21 to cooperate with the inside of a pinion 29 which has an opening the periphery of which is formed with ratchet teeth 30 and this ratchet pinion meshes with a gear of the internal type 31 on the wheel W in the usual well known manner so that the wheel W will drive the cutting mechanism only when rotating forwardly. The wheel W is journaled on a stub-shaft 22' on the plate 5.

A rotating cutting structure comprises end members 32 on the shaft 21 formed with arms 33, on the free ends of which are blades 34 for cooperating with a cutter knife 35 which is carried by the cross member 6 by means of rockers 37 rockably mounted intermediate their ends as at 38 below the cross member 6, formed integrally or otherwise affixed to the knife 35 and having forked ends 39 threadedly engaged by screws 40 threaded through members 41 formed on the cross member 6 so that by adjusting these screws the desired adjustment for cutting action may be obtained between the blades and the knife as will be readily understood.

The frame F comprises transverse upper and lower members 50 and vertical rods 51 disposed in spaced relation to each other. An end member 52 of this frame F is detachably secured to the plate 5. The other end of the frame is supported by a bracket brace or arm 56 anchored as at 57 to the cross member 6 and as at 58 to the rod 12. The frame prevents objects being collided with and damaging the cutter structure while the mower is in use.

A roller 59 is journaled between arms 60 depending from the underside of the cross member 6. A guard 61 is hingedly attached as at 62 to a bracket 63, which is bolted or screwed to the left hand extension 7. This guard 61 is pressed outwardly by means of a spring 65. A ball bearing 66 is housed in the casing 67 formed on an intermediate portion of the guard and is held in place by a removable cap 68 and eliminates friction whenever the guard engages an object from the side as will be quite apparent. The guard 61 permits close running of the mower to a curbing or the like, the outwardly directed arm of the guard serving to fend or gather the grass close to the curb into the cutting strucure, so as to bear no standing uncut grass adjacent the curbing.

The use and operation of the device is thought to be clear from the above description. Further detail description thereof is through to be unnecessary.

It is, therefore, believed that the present invention provides a simple and practical device adapted to accomplish all the advantages and objects above set forth. in a superior manner, and the principles of the same are susceptible of being embodied in different modifications within the spirit and scope of the invention.

Having thus described my invention, what I claim as new is:

1. A lawn mower of the class described comprising a side plate disposed in a vertical plane, a horizontal member extending from the bottom of the plate, a horizontal rod extending from the top of the plate, a side member supported by the horizontal rod and member, a shaft journaled in the side member and the plate, a ground engaging wheel operatively connected for rotating the shaft, a cutter reel on the shaft, a roller under the cross member, a knife adjustably mounted on the cross member to cooperate with the cutter reel, arms extending rearwardly from the cross member, an elongated roller, means for journalling the elongated roller between the rear extremities of the arms, a guard frame across the front ends of the side members and plate including upper and lower cross members and a plurality of vertical rods attached thereto in spaced relation, a guard on the side of the mower remote from the wheel hingedly mounted on the cross member, and spring means urging the guard outwardly.

2. A lawn mower of the class described comprising a side plate disposed in a vertical plane, a horizontal member extending from the bottom of the plate, a horizontal rod extending from the top of the plate, a side member supported by the horizontal member and rod, a shaft journaled in the side member and the plate, a ground engaging wheel operatively connected for rotating the shaft, a cutter reel on the shaft, a roller under the cross member, a knife adjustably mounted on the cross member to cooperate with the cutter reel, arms extending rearwardly from the cross member, an elongated roller, means for journalling the elongated roller between the rear extremities of the arms, a guard frame mounted on the forward part of the mower including upper and lower cross members and a plurality of vertical rods attached thereto in spaced relation, a guard hingedly connected with the cross member, and spring means urging the guard outwardly, said guard being located on the mower remote from the wheel.

3. A lawn mower of the class described comprising a side plate disposed in a vertical plane, a horizontal member extending from the bottom of the plate, a horizontal rod extending from the top of the plate, a side member supported by said horizontal member and rod, a shaft journaled in the side member and the plate, a ground engaging wheel operatively connected for rotating the shaft, a cutter reel on the shaft, a roller under the cross member, a knife adjustably mounted on the cross member to cooperate with the cutter reel, arms extending rearwardly from the cross member, an elongated roller, means for journalling the elongated roller between the rear extremities of the arms, a guard frame for positioning on the front of the mower including upper and lower cross members and a plurality of vertical rods attached thereto in spaced relation, a guard hingedly connected with the cross member, and spring means urging the guard outwardly, said guard being located on the mower remote from the wheel, a ball bearing mounted on the outer side of the guard.

4. A lawn mower of the class described comprising a transverse bar, a plate rising from each end thereof, and a horizontal rod connecting the ends of the plates, a pair of forwardly and downwardly directed journal brackets on the underside of the transverse member, a roller freely carried between said brackets, a shaft journalled across the plates, a cutter reel on the shaft, an adjustable knife on the transverse bar for cooperation with the cutter reel, a pair of rearwardly extended arms on the lower portions of said plates, a freely rotatable roller journalled between the rear ends of said arms, and a ground engaging wheel carried in a stub axle projected from the outside of one of said plates, and a pinion on one end of the shaft, and gear teeth on the wheel for cooperation in rotating the cutter reel, and a guard for the cutter reel mounted forward of the reel comprising a plurality of horizontal and vertical bars, the lower ends of the vertical bars being slightly forwardly directed, and a curb engaging guard consisting of a horizontally rockable arm secured on the lower side portion of the mower remote from the said wheel, and a spring between the mower and the rockable arm for mounting its free end normally directed away from the mower for engaging a wall or the like for directing the grass adjacent the bottom of the wall into the path of the mower.

In testimony whereof I affix my signature.

JULIAN N. WETMORE.